United States Patent
Jeol et al.

(10) Patent No.: US 11,453,774 B2
(45) Date of Patent: Sep. 27, 2022

(54) METHOD OF MAKING A THREE-DIMENSIONAL OBJECT USING A POLY(ETHER ETHER KETONE) POLYMERIC COMPONENT

(71) Applicant: SOLVAY SPECIALTY POLYMERS USA, LLC, Alpharetta, GA (US)

(72) Inventors: Stéphane Jeol, Cumming, GA (US); Nancy J. Singletary, Alpharetta, GA (US); Hai Van, Norcross, GA (US); James Brown Hicks, Lawrenceville, GA (US)

(*) Notice: Subject to any disclaimer, the term of this patent is extended or adjusted under 35 U.S.C. 154(b) by 271 days.

(21) Appl. No.: 16/607,149

(22) PCT Filed: Mar. 30, 2018

(86) PCT No.: PCT/EP2018/058319
§ 371 (c)(1),
(2) Date: Oct. 22, 2019

(87) PCT Pub. No.: WO2018/197157
PCT Pub. Date: Nov. 1, 2018

(65) Prior Publication Data
US 2021/0277225 A1 Sep. 9, 2021

Related U.S. Application Data

(60) Provisional application No. 62/489,731, filed on Apr. 25, 2017.

(30) Foreign Application Priority Data

Aug. 1, 2017 (EP) .................................. 17184201

(51) Int. Cl.
*B33Y 10/00* (2015.01)
*B33Y 70/00* (2020.01)
*B29C 64/314* (2017.01)
*B29C 64/118* (2017.01)
*B33Y 40/10* (2020.01)
*B29K 71/00* (2006.01)
*C08L 61/16* (2006.01)

(52) U.S. Cl.
CPC ............ *C08L 61/16* (2013.01); *B29C 64/118* (2017.08); *B29C 64/314* (2017.08); *B33Y 10/00* (2014.12); *B33Y 40/10* (2020.01); *B33Y 70/00* (2014.12); *B29K 2071/00* (2013.01); *C08L 2205/025* (2013.01); *C08L 2205/03* (2013.01)

(58) Field of Classification Search
CPC ............... C08L 61/16; C08L 2205/025; C08L 2205/03; C08L 71/00; B29C 64/118; B29C 64/314; B33Y 10/00; B33Y 40/10; B33Y 70/00; B29K 2071/00; C08G 2650/40; C08G 65/4012
See application file for complete search history.

(56) References Cited

U.S. PATENT DOCUMENTS

| | | | |
|---|---|---|---|
| 5,418,035 A | 5/1995 | Iguchi et al. | |
| 2015/0251353 A1 | 9/2015 | Rodgers et al. | |
| 2016/0297142 A1 | 10/2016 | Bheda et al. | |
| 2017/0096576 A1 | 4/2017 | Bheda et al. | |
| 2018/0258559 A1* | 9/2018 | Dadmun | B33Y 50/02 |
| 2020/0291214 A1* | 9/2020 | Cherian | C08L 25/14 |

FOREIGN PATENT DOCUMENTS

| GB | 2542704 A | 3/2017 |
|---|---|---|
| WO | 2017167691 A1 | 10/2017 |

* cited by examiner

*Primary Examiner* — Nahida Sultana
(74) *Attorney, Agent, or Firm* — Osha Bergman Watanabe & Burton LLP

(57) ABSTRACT

The present disclosure relates to method of making three-dimensional (3D) objects using an additive manufacturing system wherein the part material comprises a polymeric component comprising at least one poly(ether ether ketone) polymer (PEEK) having a weight average molecular weight (Mw) ranging from 75,000 to 100,000 g/mol (as determined by GPC), for example in the form of filaments or spherical particles, for use in additive manufacturing systems to print 3D objects.

21 Claims, No Drawings

METHOD OF MAKING A THREE-DIMENSIONAL OBJECT USING A POLY(ETHER ETHER KETONE) POLYMERIC COMPONENT

CROSS-REFERENCE TO RELATED APPLICATIONS

This application is a U.S. national stage entry under 35 U.S.C. § 371 of International Application No. PCT/EP2018/058319 filed Mar. 30, 2018, which claims priority to U.S. provisional application No. 62/489,731, filed Apr. 25, 2017, and to European application No. 17184201.6, filed Aug. 1, 2017, the whole content of each of these applications being incorporated herein by reference for all purposes.

TECHNICAL FIELD

The present disclosure relates to a method of making a three-dimensional (3D) object, comprising
extruding a part material to print layers of the 3D object, wherein the part material comprises a polymeric component selected from the group consisting of:
i) at least one poly(ether ether ketone) polymer (PEEK) having a weight average molecular weight (Mw) ranging from 75,000 to 100,000 g/mol (as determined by gel permeation chromatography (GPC) using phenol and trichlorobenzene (1:1) at 160° C., with polystyrene standards), and
ii) at least two PEEK polymers having different Mw, the blend thereof having a weight average molecular weight (Mw) ranging from 75,000 to 100,000 g/mol (as determined by gel permeation chromatography (GPC) using phenol and trichlorobenzene (1:1) at 160° C., with polystyrene standards),
wherein the PEEK polymer(s) comprises at least 95 mol. % of recurring units ($R_{PEEK}$) of formula (J-A), based on the total number of moles in the polymer:

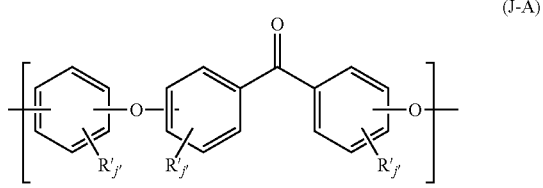

(J-A)

where
R', at each location, is independently selected from the group consisting of halogen, alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine and quaternary ammonium; and
J', for each R', is independently zero or an integer ranging from 1 to 4 (for example 1, 2, 3 or 4).

In particular, the present disclosure relates to the part material in the form of filaments, for use in additive manufacturing systems to print 3D objects.

BACKGROUND

Additive manufacturing systems are used to print or otherwise build 3D parts from digital representations of the 3D parts using one or more additive manufacturing techniques. Examples of commercially available additive manufacturing techniques include extrusion-based techniques, selective laser sintering, powder/binder jetting, electron-beam melting and stereolithography processes. For each of these techniques, the digital representation of the 3D part is initially sliced into multiple horizontal layers. For each sliced layer, a tool path is then generated, which provides instructions for the particular additive manufacturing system to print the given layer.

For example, in an extrusion-based additive manufacturing system, a 3D part may be printed from a digital representation of the 3D part in a layer-by-layer manner by extruding and adjoining strips of a part material. The part material is extruded through an extrusion tip carried by a print head of the system, and is deposited as a sequence of roads on a platen in an x-y plane. The extruded part material fuses to previously deposited part material, and solidifies upon a drop in temperature. The position of the print head relative to the substrate is then incremented along a z-axis (perpendicular to the x-y plane), and the process is then repeated to form a 3D part resembling the digital representation. An example of extrusion-based additive manufacturing system starting from filaments is called Fused Filament Fabrication (FFF), also known as Fused Deposition Modelling (FDM).

One of the fundamental limitations associated with known additive manufacturing methods is based on the lack of identification of a polymeric material which allows obtaining a resulting 3D part with acceptable mechanical properties.

There is therefore a need for polymeric part material to be used in additive manufacturing systems, for example FFF printing methods, which make possible the manufacture of 3D objects presenting improved set of mechanical properties (e.g. impact resistance, elongation and tensile properties).

SUMMARY

An aspect of the present disclosure is directed to a method of making a three-dimensional (3D) object, comprising extruding a part material to print layers of the 3D object, wherein the
part material comprises a polymeric component selected from the group consisting of:
i) at least one poly(ether ether ketone) polymer (PEEK) having a weight average molecular weight (Mw) ranging from 75,000 to 100,000 g/mol (as determined by gel permeation chromatography (GPC) using phenol and trichlorobenzene (1:1) at 160° C., with polystyrene standards), and
ii) at least two PEEK polymers having different Mw, the blend thereof having a weight average molecular weight (Mw) ranging from 75,000 to 100,000 g/mol (as determined by gel permeation chromatography (GPC) using phenol and trichlorobenzene (1:1) at 160° C., with polystyrene standards),
wherein the PEEK polymer(s) comprises at least 95 mol. % of recurring units ($R_{PEEK}$) of formula (J-A), based on the total number of moles in the polymer:

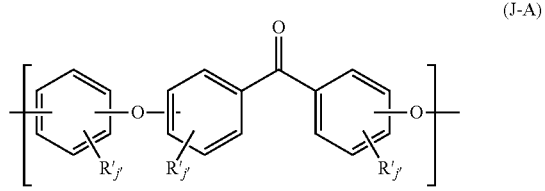

(J-A)

where
  R', at each location, is independently selected from the group consisting of halogen, alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine and quaternary ammonium; and
  J', for each R', is independently zero or an integer ranging from 1 to 4 (for example 1, 2, 3 or 4).

Another aspect of the disclosure is directed to a filament material comprising a polymeric component selected from the group consisting of:
  i) at least one poly(ether ether ketone) polymer (PEEK) having a weight average molecular weight (Mw) ranging from 75,000 to 100,000 g/mol (as determined by gel permeation chromatography (GPO) using phenol and trichlorobenzene (1:1) at 16000, with polystyrene standards), and
  ii) at least two PEEK polymers having different Mw, the blend thereof having a weight average molecular weight (Mw) ranging from 75,000 to 100,000 g/mol (as determined by gel permeation chromatography (GPO) using phenol and trichlorobenzene (1:1) at 16000, with polystyrene standards), wherein the PEEK polymer(s) comprises at least 95 mol. % of recurring units ($R_{PEEK}$) of formula (J-A). based on the total number of moles in the polymer:

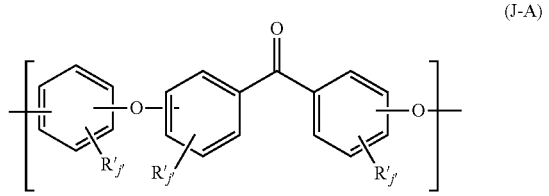

(J-A)

where
  R', at each location, is independently selected from the group consisting of halogen, alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine and quaternary ammonium; and
  J', for each R', is independently zero or an integer ranging from 1 to 4 (for example 1, 2, 3 or 4).

Another aspect yet of the present disclosure is directed to the use of the part material for the manufacture of three-dimensional objects using extrusion-based additive manufacturing system (for example FFF) or for the manufacture of a filament for use in the manufacture of 3D objects, the part material comprising a polymeric component selected from the group consisting of:
  i) at least one poly(ether ether ketone) polymer (PEEK) having a weight average molecular weight (Mw) ranging from 75,000 to 100,000 g/mol (as determined by gel permeation chromatography (GPC) using phenol and trichlorobenzene (1:1) at 160° C., with polystyrene standards), and
  ii) at least two PEEK polymers having different Mw, the blend thereof having a weight average molecular weight (Mw) ranging from 75,000 to 100,000 g/mol (as determined by gel permeation chromatography (GPC) using phenol and trichlorobenzene (1:1) at 160° C., with polystyrene standards), wherein the PEEK polymer(s) comprises at least 95 mol. % of recurring units ($R_{PEEK}$) of formula (J-A), based on the total number of moles in the polymer:

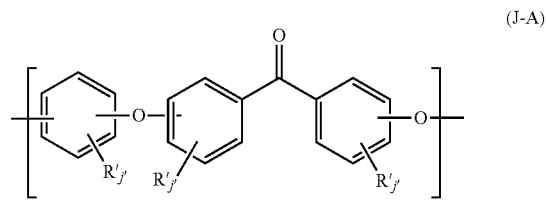

(J-A)

where
  R', at each location, is independently selected from the group consisting of halogen, alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine and quaternary ammonium; and
  J', for each R', is independently zero or an integer ranging from 1 to 4 (for example 1, 2, 3 or 4).

The selection of i) a PEEK polymer of a specific molecular weight, or of ii) a blend of at least two PEEK polymers of different molecular weight, the blend thereof having this specific molecular weight, allow the manufacture of 3D objects presenting improved mechanical properties (e.g. tensile properties and impact resistance). This PEEK polymer or PEEK polymers blend has a Mw from 75,000 to 100,000 g/mol (as determined by the gel permeation chromatography (GPC) method described herein), for example from 77,000 to 98,000 g/mol, from 79,000 to 96,000 g/mol or from 81,000 to 95,000 g/mol.

The 3D objects or articles obtainable by such method of manufacture can be used in a variety of final applications. Mention can be made in particular of implantable device, dental prostheses, brackets and complex shaped parts in the aerospace industry and under-the-hood parts in the automotive industry.

DESCRIPTION OF EMBODIMENTS

The present disclosure relates to a method of making a three-dimensional (3D) object using an extrusion-based additive manufacturing system (for example FFF). This method comprises the steps of:
  a) providing a part material comprising a polymeric component, and
  b) extruding the part material to print layers of the 3D object.

The polymeric component of the present disclosure, comprising:
  i) a PEEK polymer of a specific molecular weight, or
  ii) a PEEK polymers blend, the blend having a specific molecular weight, allows the manufacture of 3D objects having a good mechanical property profile (i.e. tensile elongation and impact resistance).

The expression "part material" hereby refers to a blend of materials, notably polymeric compound(s), intended to form at least a part of the 3D object. The part material can also be composed of one polymeric component only. The part material is, according to the present disclosure, used as feedstock material to be used for the manufacture of 3D objects or part of 3D objects.

The method of the present disclosure employs the polymeric component as an essential feature of the part material, which can for example be shaped in the form of a filament, to build a 3D object (e.g. a 3D model, a 3D article or a 3D part).

In the present application:
any description, even though described in relation to a specific embodiment, is applicable to and interchangeable with other embodiments of the present disclosure;
where an element or component is said to be included in and/or selected from a list of recited elements or components, it should be understood that in related embodiments explicitly contemplated here, the element or component can also be any one of the individual recited elements or components, or can also be selected from a group consisting of any two or more of the explicitly listed elements or components; any element or component recited in a list of elements or components may be omitted from such list; and
any recitation herein of numerical ranges by endpoints includes all numbers subsumed within the recited ranges as well as the endpoints of the range and equivalents.

According to an embodiment, the part material is in the form of a filament. The expression "filament" refers to a thread-like object or fiber formed of a material or a blend of materials which according to the present disclosure comprises at least one PEEK component (one polymer or a polymeric blend) having a Mw from 75,000 to 100,000 g/mol (as determined by the gel permeation chromatography (GPC) method herein). The PEEK component is selected from the group consisting of:
i) at least one PEEK polymer having a weight average molecular weight (Mw) ranging from 75,000 to 100,000 g/mol (as determined by gel permeation chromatography (GPC) using phenol and trichlorobenzene (1:1) at 160° C., with polystyrene standards), and
ii) at least two PEEK polymers having different Mw, the blend thereof having a Mw ranging from 75,000 to 100,000 g/mol (as determined by gel permeation chromatography (GPC) using phenol and trichlorobenzene (1:1) at 160° C., with polystyrene standards),
wherein the PEEK polymer(s) comprises at least 95 mol. % of recurring units ($R_{PEEK}$) of formula (J-A), based on the total number of moles in the polymer:

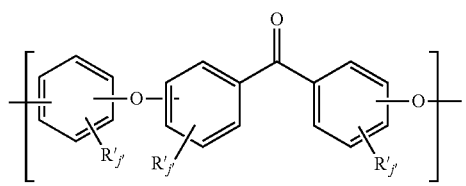

(J-A)

where
R', at each location, is independently selected from the group consisting of halogen, alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine and quaternary ammonium; and
J', for each R', is independently zero or an integer ranging from 1 to 4 (for example 1, 2, 3 or 4).

The filament of the present invention has a cylindrical or substantially cylindrical geometry. FFF 3D printers are, for example, commercially available from Indmatech, from Hyrel, from Roboze or from Stratasys, Inc. (under the trade name Fortus®). SLS 3D printers are, for example, available from EOS Corporation under the trade name EOSINT® P. FRTP 3D printers are, for example, available from Markforged.

Part Material

The part material employed in the method of the present disclosure comprises a polymeric component selected from the group consisting of:
i) at least one PEEK polymer having a Mw ranging from 75,000 to 100,000 g/mol (as determined by gel permeation chromatography (GPC) using phenol and trichlorobenzene (1:1) at 160° C., with polystyrene standards), and
ii) at least two PEEK polymers having different Mw, the blend thereof having a Mw ranging from 75,000 to 100,000 g/mol (as determined by gel permeation chromatography (GPC) using phenol and trichlorobenzene (1:1) at 160° C., with polystyrene standards),
wherein the PEEK polymer(s) comprises at least 95 mol. % of recurring units ($R_{PEEK}$) of formula (J-A), based on the total number of moles in the polymer:

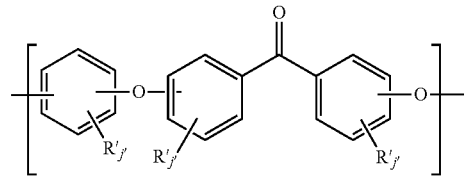

(J-A)

where
R', at each location, is independently selected from the group consisting of halogen, alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine and quaternary ammonium; and
J', for each R', is independently zero or an integer ranging from 1 to 4 (for example 1, 2, 3 or 4).

The part material of the disclosure may include other components. For example the part material may comprise at least one additive, notably at least one additive selected from the group consisting of fillers, colorants, lubricants, plasticizers, stabilizers, flame retardants, nucleating agents, flow enhancer and combinations thereof. Fillers in this context can be reinforcing or non-reinforcing in nature.

In embodiments that include fillers, the concentration of the fillers in the part material ranges from 0.1 wt. % to 30 wt. %, with respect to the total weight of the part material. Suitable fillers include calcium carbonate, magnesium carbonate, glass fibers, graphite, carbon black, carbon fibers, carbon nanofibers, graphene, graphene oxide, fullerenes, talc, wollastonite, mica, alumina, silica, titanium dioxide, kaolin, silicon carbide, zirconium tungstate, boron nitride and combinations thereof.

According to an embodiment of the present invention, the part material may comprise at least one additive selected from the group consisting of hydroxyapatite, α-tricalcium phosphate (α-TCP), β-TCP and barium sulfate (BaSO$_4$). According to one embodiment, the part material of the present disclosure comprises:
- a polymeric component comprising at least one PEEK polymer having a Mw from 75,000 to 100,000 g/mol (as determined by GPC), and
- from 0 to 30 wt. % of at least one additive, for example selected from the group consisting of fillers, colorants, lubricants, plasticizers, flame retardants, nucleating agents, flow enhancers and stabilizers, based on the total weight of the part material.

According to another embodiment, the part material of the present disclosure consists essentially of:
- a polymeric component comprising at least one PEEK polymer having a Mw from 75,000 to 100,000 g/mol (as determined by GPC), and
- from 0 to 30 wt. % of at least one additive, for example selected from the group consisting of fillers, colorants, lubricants, plasticizers, flame retardants, nucleating agents, flow enhancers and stabilizers, based on the total weight of the part material.

According to another embodiment, the part material of the present disclosure comprises:
- at least two PEEK polymers having different Mw (for example two, three or four PEEK polymers of different Mw), the blend thereof having a Mw from 75,000 to 100,000 g/mol (as determined by GPC), and
- from 0 to 30 wt. % of at least one additive, for example selected from the group consisting of fillers, colorants, lubricants, plasticizers, flame retardants, nucleating agents, flow enhancers and stabilizers, based on the total weight of the part material.

According to another embodiment, the part material of the present disclosure consists essentially of:
- at least two PEEK polymers having different Mw (for example two, three or four PEEK polymers of different Mw), the blend thereof having a Mw from 75,000 to 100,000 g/mol (as determined by GPC), and
- from 0 to 30 wt. % of at least one additive, for example selected from the group consisting of fillers, colorants, lubricants, plasticizers, flame retardants, nucleating agents, flow enhancers and stabilizers, based on the total weight of the part material.

Poly(Ether Ether Ketone) (PEEK)

As used herein, a poly(ether ether ketone) (PEEK) denotes any polymer comprising at least 95 mol. % of recurring units (R$_{PEEK}$) of formula (J-A), based on the total number of moles in the polymer:

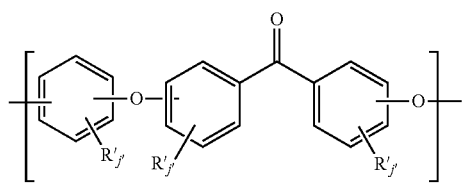
(J-A)

where
R', at each location, is independently selected from the group consisting of halogen, alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine and quaternary ammonium; and j', for each R', is independently zero or an integer ranging from 1 to 4 (for example 1, 2, 3 or 4).

Each phenylene moiety of the recurring unit (R$_{PEEK}$) may, independently from one another, have a 1,2-, a 1,3- or a 1,4-linkage to the other phenylene moieties. According to an embodiment, each phenylene moiety of the recurring unit (R$_{PEEK}$), independently from one another, has a 1,3- or a 1,4-linkage to the other phenylene moieties. According to another embodiment yet, each phenylene moiety of the recurring unit (R$_{PEEK}$) has a 1,4-linkage to the other phenylene moieties.

According to an embodiment, R' is, at each location in formula (J-A) above, independently selected from the group consisting of a C1-C12 moiety optionally comprising one or more than one heteroatoms; sulfonic acid and sulfonate groups; phosphonic acid and phosphonate groups; amine and quaternary ammonium groups.

According to an embodiment, j' is zero for each R'. In other words, according to this embodiment, the recurring units (R$_{PEEK}$) are according to formula (J'-A):

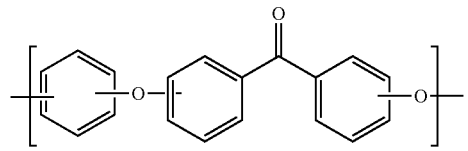
(J'-A)

According to an embodiment of the present disclosure, at least 96 mol. %, at least 97 mol. %, at least 98 mol. %, at least 99 mol. % or all of the recurring units in the PEEK are recurring units (R$_{PEEK}$) of formulae (J-A) and/or (J'-A).

According to another embodiment of the present disclosure, a poly(ether ether ketone) (PEEK) denotes any polymer comprising at least 95 mol. % of the recurring units are recurring units (R$_{PEEK}$) of formula (J-A"):

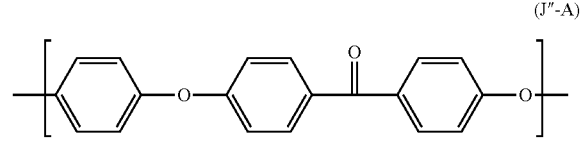
(J"-A)

(the mol. % being based on the total number of moles in the polymer).

According to an embodiment of the present disclosure, at least 96 mol. %, at least 97 mol. %, at least 98 mol. %, at least 99 mol. % or all of the recurring units in the PEEK are recurring units (R$_{PEEK}$) of formula (J"-A).

The PEEK polymer of the present disclosure can therefore be a homopolymer or a copolymer having more than 95 mol % of recurring units (R$_{PEEK}$). If it is a copolymer, it can be a random, alternate or block copolymer.

Defects, end groups and monomers' impurities may be incorporated in very minor amounts in the polymer (PEEK) of the present disclosure, so as to advantageously not affecting negatively the performances of the same.

PEEK is commercially available as KetaSpire® PEEK from Solvay Specialty Polymers USA, LLC.

PEEK can be prepared by any method known in the art. It can for example result from the condensation of 4,4'-difluorobenzophenone and hydroquinone in presence of a base. The reaction of monomer units takes place through a nucleophilic aromatic substitution. The molecular weight (for example the weight average molecular weight Mw) can be obtained by adjusting the monomers molar ratio and measuring the yield of polymerisation (e.g. measure of the torque of the impeller that stirs the reaction mixture).

According to one embodiment of the present disclosure, the part material comprises at least one PEEK polymer having a weight average molecular weight (Mw) ranging from 75,000 to 100,000 g/mol, for example from 77,000 to 98,000 g/mol, from 79,000 to 96,000 g/mol, from 81,000 to 95,000 g/mol, or from 85,000 to 94,500 g/mol (as determined by gel permeation chromatography (GPC) using phenol and trichlorobenzene (1:1) at 160° C., with polystyrene standards).

According to another embodiment, the part material comprises at least two PEEK polymers of different Mw, the blend thereof having a weight average molecular weight (Mw) ranging from 75,000 to 100,000 g/mol, for example from 77,000 to 98,000 g/mol, from 79,000 to 96,000 g/mol, from 81,000 to 95,000 g/mol, or from 85,000 to 94,500 g/mol (as determined by gel permeation chromatography (GPC) using phenol and trichlorobenzene (1:1) at 160° C., with polystyrene standards). The two PEEK polymers can notably have Mw outside of the blend's Mw, lower than 75,000 g/mol and/or higher than 100,000 g/mol. For example, the blend comprises:
  a PEEK polymer having a Mw ranging from 50,000 to 85,000 g/mol, for example from 52,000 to 83,000 g/mol or from 54,000 to 81,000 g/mol, and
  a PEEK polymer having a Mw ranging from 85,000 to 120,000 g/mol, from 87,000 to 118,000 g/mol or from 89,000 to 116,000 g/mol, as determined by gel permeation chromatography (GPC) using phenol and trichlorobenzene (1:1) at 160° C., with polystyrene standards. As another example, the blend can comprise:
  from 10 to 60 wt. % (based on the total weight of the blend) of a PEEK polymer having a Mw ranging from 50,000 to 85,000 g/mol, for example from 20 to 50 wt. % or from 30 to 45 wt. %, and
  from 40 to 90 wt. % (based on the total weight of the blend) of a PEEK polymer having a Mw ranging from 85,000 to 120,000 g/mol, for example from 50 to 80 wt. % or from 55 to 70 wt. %.

The weight average molecular weight (Mw) of PEEK, can be determined by gel permeation chromatography (GPC) using phenol and trichlorobenzene (1:1) at 160° C. (2×PL Gel mixed B, 10 m, 300×7.5 mm using a Polymer Laboratories PL-220 unit; flow rate: 1.0 mL/min; injection volume: 200 µL of a 0.2 w/v % sample solution), with polystyrene standards.

More precisely, the weight average molecular weight (Mw) can be measured by gel permeation chromatography (GPC) as described in the experimental section. According to the method used in the experimental part, samples were dissolved in a 1:1 mixture of phenol and 1,2,4-trichlorobenzene at 190° C. temperature. Samples were then passed through 2×PL Gel mixed B, 10 m, 300×7.5 mm using a Polymer Laboratories PL-220 unit maintained at 160° C. equipped with a differential refractive index detector and calibrated with 12 narrow molecular weight polystyrene standards (Peak molecular weight range: 1,000-1,000,000). A flow rate of 1.0 mL/min and injection volume of 200 µL of a 0.2 w/v % sample solution was selected. The weight average molecular weight (Mw) was reported.

The polymers can be characterized by their weight average molecular weight (Mw), and they can also be characterized by their polydispersity index ("PDI" or "PDI index" herewith), also called sometimes polymolecularity index. The PDI index corresponds to the molar weight distribution of the various macromolecules within the polymer. The PDI index corresponds to the ratio Mw/Mn, Mn being the number average molecular weight and determined by GPC.

According to another embodiment of the present disclosure, the PDI index of the PEEK polymer or PEEK polymers blend is from 1.8 to 2.5, for example from 1.9 to 2.4 or 1.95 to 2.3.

According to one embodiment of the present disclosure, the part material comprises a polymeric component which comprises at least one PEEK polymer having a Mw from 75,000 to 100,000 g/mol (as determined by the gel permeation chromatography (GPC) method herein). According to this embodiment, the polymeric component of the part material can for example comprise at least 60 wt. % of such PEEK polymer, for example, at least 70 wt. %, at least 90 wt. %, at least 95 wt. % or at least 99 wt. %, based on the total weight of the polymeric component of the part material.

According to one embodiment of the present disclosure, the part material comprises a polymeric component which comprises at least two PEEK polymers, the blend thereof having a Mw from 75,000 to 100,000 g/mol (as determined by the gel permeation chromatography (GPC) method herein). According to this embodiment, the polymeric component of the part material can for example comprise at least 60 wt. % of such PEEK polymers blend, for example, at least 70 wt. %, at least 90 wt. %, at least 95 wt. % or at least 99 wt. %, based on the total weight of the polymeric component of the part material.

According to another embodiment, the part material comprises a polymeric component which consists essentially in PEEK polymer(s) having a weight average molecular weight (Mw) from 75,000 to 100,000 g/mol (as determined by the gel permeation chromatography (GPC) method herein) as defined above.

According to an embodiment of the present disclosure, the part material comprises:
  a polymeric component comprising:
  i) at least one PEEK polymer having a weight average molecular weight (Mw) from 75,000 to 100,000 g/mol (as determined by the gel permeation chromatography (GPC) method herein), or
  ii) a polymeric component comprising at least two PEEK polymers of different Mw, the blend thereof having a weight average molecular weight (Mw) from 75,000 to 100,000 g/mol (as determined by the gel permeation chromatography (GPC) method herein), and
  from 0 to 30 wt. %, from 0.5 to 28 wt. % or from 1 to 25 wt. % of at least one additive selected from the group consisting of fillers, colorants, lubricants, plasticizers, flame retardants, nucleating agent, flow enhancer and stabilizers, based on the total weight of the part material.

Such part material advantageously presents, when used to manufacture 3D objects, a good mechanical property profile (i.e. tensile elongation and impact resistance) over PEEK polymer(s)/blends of higher or lower Mw.

The part material of the present disclosure can be made by methods well known to the person of ordinary skill in the art. For example, such methods include, but are not limited to, melt-mixing processes. Melt-mixing processes are typically carried out by heating the polymer components above the melting temperature of the thermoplastic polymers thereby forming a melt of the thermoplastic polymers. In some embodiments, the processing temperature ranges from about 280-450° C., preferably from about 290-440° C., from about 300-430° C. or from about 310-420° C. Suitable melt-mixing apparatus are, for example, kneaders, Banbury mixers, single-screw extruders, and twin-screw extruders. Preferably, use is made of an extruder fitted with means for dosing all the desired components to the extruder, either to the extruder's throat or to the melt. In the process for the preparation of the part material, the components of the part material, i.e. PEEK and optionally additives, are fed to the melt-mixing apparatus and melt-mixed in that apparatus. The components may be fed simultaneously as a powder mixture or granule mixer, also known as dry-blend, or may be fed separately.

The order of combining the components during melt-mixing is not particularly limited. In one embodiment, the component can be mixed in a single batch, such that the desired amounts of each component are added together and subsequently mixed. In other embodiments, a first sub-set of components can be initially mixed together and one or more of the remaining components can be added to the mixture for further mixing. For clarity, the total desired amount of each component does not have to be mixed as a single quantity. For example, for one or more of the components, a partial quantity can be initially added and mixed and, subsequently, some or all of the remainder can be added and mixed.

Filament Material

The present disclosure also relates to a filament material having a cylindrical geometry and a diameter comprised between 0.5 and 5 mm±0.15 mm, comprising a polymeric component selected from the group consisting of:

i) at least one poly(ether ether ketone) polymer (PEEK) having a weight average molecular weight (Mw) ranging from 75,000 to 100,000 g/mol (as determined by gel permeation chromatography (GPC) using phenol and trichlorobenzene (1:1) at 160° C., with polystyrene standards), and ii) at least two PEEK polymers having different Mw, the blend thereof having a weight average molecular weight (Mw) ranging from 75,000 to 100,000 g/mol (as determined by gel permeation chromatography (GPC) using phenol and trichlorobenzene (1:1) at 160° C., with polystyrene standards), wherein the PEEK polymer(s) comprises at least 95 mol. % of recurring units ($R_{PEEK}$) of formula (J-A), based on the total number of moles in the polymer:

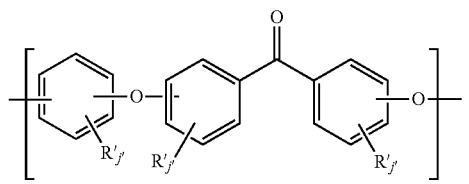

(J-A)

where

R', at each location, is independently selected from the group consisting of halogen, alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine and quaternary ammonium; and J', for each R', is independently zero or an integer ranging from 1 to 4 (for example 1, 2, 3 or 4).

This filament material can be used in a method of making a three-dimensional object using an extrusion-based additive manufacturing system (for example FFF).

All of the embodiments described above with respect to the part material do apply equally to the filament material.

As an example, the filament material of the disclosure may include other components. For example the filament material may comprise at least one additive, notably at least one additive selected from the group consisting of fillers, colorants, lubricants, plasticizers, stabilizers, flame retardants, nucleating agents, flow enhancers and combinations thereof.

The filament of the present invention has a cylindrical or substantially cylindrical geometry.

The filament diameter varies between 0.5 mm and 5 mm±0.15 mm, for example between 0.8 and 4 mm±0.15 mm or for example between 1 mm and 3.5 mm±0.15 mm. The diameter of the filament can be chosen to feed a specific FFF 3D printer. An example of filament diameter used extensively in FFF process is 1.75 mm±0.15 mm or 2.85 mm±0.15 mm diameter.

The filament of the present disclosure can be made from the part material by methods including, but not limited to, melt-mixing processes. Melt-mixing processes are typically carried out by heating the polymer components above the melting temperature of the thermoplastic polymers thereby forming a melt of the thermoplastic polymers. The processing temperature has to be at least 15° C. above the melting point of the polymer. In some embodiments, the processing temperature ranges from about 280-450° C., preferably from about 290-440° C., from about 300-430° C., from about 310-420° C., or from about 350° C.-410° C.

The process for the preparation of the filament can be carried out in a melt-mixing apparatus, for which any melt-mixing apparatus known to the one skilled in the art of preparing polymer compositions by melt mixing can be used. Suitable melt-mixing apparatus are, for example, kneaders, Banbury mixers, single-screw extruders, and twin-screw extruders. Preferably, use is made of an extruder fitted with means for dosing all the desired components to the extruder, either to the extruder's throat or to the melt. In the process for the preparation of the filament, the components of the part material, i.e. at least PEEK polymer and optionally additives, are fed to the melt-mixing apparatus and melt-mixed in that apparatus. The components may be fed simultaneously as a powder mixture or granule mixer, also known as dry-blend, or may be fed separately.

The order of combining the components during melt-mixing is not particularly limited. In one embodiment, the component can be mixed in a single batch, such that the desired amounts of each component are added together and subsequently mixed. In other embodiments, a first sub-set of components can be initially mixed together and one or more of the remaining components can be added to the mixture for further mixing. For clarity, the total desired amount of each component does not have to be mixed as a single quantity. For example, for one or more of the components, a partial quantity can be initially added and mixed and, subsequently, some or all of the remainder can be added and mixed.

The method of making the filaments also comprises a step of extrusion, for example with a die. For this purpose, any standard molding technique can be used; standard techniques including shaping the polymer compositions in a molten/softened form can be advantageously applied, and include notably compression molding, extrusion molding, injection molding, transfer molding and the like. Extrusion molding is preferred. Dies may be used to shape the articles, for example a die having a circular orifice if the article is a filament of cylindrical geometry.

The method may comprise if needed several successive steps of melt-mixing or extrusion under different conditions.

The process itself, or each step of the process if relevant, may also comprise a step consisting in a cooling of the molten mixture.

Support Material

The method of the present disclosure may also employ another polymeric component to support the 3D object under construction. This polymeric component, similar or distinct from the part material used to build a 3D object, is hereby called support material. Support material may be required during 3D printing to provide vertical and/or lateral support in the higher operating conditions required for the high-temperature part materials (e.g. PEEK requiring a processing temperature around 350-440° C.).

The support material, possibly used in the context of the present method, advantageously possesses a high melting temperature (i.e. above 260° C.), in order to resist high temperature applications. The support material may also possess a water absorption behaviour or a solubility in water at a temperature lower than 110° C., in order sufficiently swell or deform upon exposure to moisture.

According to an embodiment of the present disclosure, the method of making a three-dimensional object with an additive manufacturing system further comprises the steps of:

providing a support material, printing layers of a support structure from the support material, and removing at least a portion of the support structure from the three-dimensional object.

A variety of polymeric components can be used as a support material. Notably, support material can comprise polyamides or copolyamides, such as for example the ones described in U.S. provisional application No. 62/316,835 and U.S. provisional application No. 62/419,035.

Applications

The present disclosure also relates to the use of a part material for the manufacture of three-dimensional objects using an extrusion-based additive manufacturing system (for example FFF), where the part material comprises a polymeric component selected from the group consisting of:

i) at least one poly(ether ether ketone) polymer (PEEK) having a weight average molecular weight (Mw) ranging from 75,000 to 100,000 g/mol (as determined by gel permeation chromatography (GPC) using phenol and trichlorobenzene (1:1) at 160° C., with polystyrene standards), and ii) at least two PEEK polymers having different Mw, the blend thereof having a weight average molecular weight (Mw) ranging from 75,000 to 100,000 g/mol (as determined by gel permeation chromatography (GPC) using phenol and trichlorobenzene (1:1) at 160° C., with polystyrene standards), wherein the PEEK polymer(s) comprises at least 95 mol. % of recurring units ($R_{PEEK}$) of formula (J-A), based on the total number of moles in the polymer:

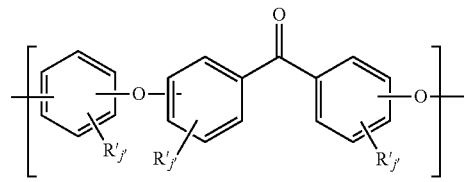

(J-A)

where

R', at each location, is independently selected from the group consisting of halogen, alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine and quaternary ammonium; and J', for each R', is independently zero or an integer ranging from 1 to 4 (for example 1, 2, 3 or 4).

The present disclosure also relates to the use of a filament material comprising a polymeric component selected from the group consisting of:

i) at least one poly(ether ether ketone) polymer (PEEK) having a weight average molecular weight (Mw) ranging from 75,000 to 100,000 g/mol (as determined by gel permeation chromatography (GPC) using phenol and trichlorobenzene (1:1) at 160° C., with polystyrene standards), and ii) at least two PEEK polymers having different Mw, the blend thereof having a weight average molecular weight (Mw) ranging from 75,000 to 100,000 g/mol (as determined by gel permeation chromatography (GPC) using phenol and trichlorobenzene (1:1) at 160° C., with polystyrene standards), wherein the PEEK polymer(s) comprises at least 95 mol. % of recurring units ($R_{PEEK}$) of formula (J-A), based on the total number of moles in the polymer:

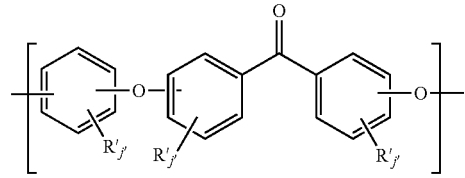

(J-A)

where

R', at each location, is independently selected from the group consisting of halogen, alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine and quaternary ammonium; and J', for each R', is independently zero or an integer ranging from 1 to 4 (for example 1, 2, 3 or 4), for the manufacture of three-dimensional objects for example using an extrusion-based additive manufacturing system (for example FFF).

All of the embodiments described above with respect to the part material do apply equally to the use of the part material or the use of the filament material.

The present disclosure also relates to the use of a part material for the manufacture of a filament for use in the manufacture of three-dimensional objects, for example using an extrusion-based additive manufacturing system (for example FFF).

The present disclosure also relates to 3D objects or 3D articles obtainable, at least in part, from the method of manufacture of the present disclosure, using the part material herein described, comprising a PEEK polymer or a PEEK polymers blend having an optimized Mw. These 3D objects or 3D articles present improved mechanical properties, notably impact strength (or impact resistance, for example notched impact resistance) and tensile strength or elongation, over article obtained from part material comprising PEEK polymer of a lower or higher Mw.

According to an embodiment, the 3D objects of the present invention present a tensile strength at yield of at least 80 MPa, as measured according to ASTM D638 method with Type V bars, preferably at least 81 MPa, at least 82 MPa or even at least 83 MPa.

The 3D objects or articles obtainable by such method of manufacture can be used in a variety of final applications. Mention can be made in particular of implantable device, dental prostheses, brackets and complex shaped parts in the aerospace industry and under-the-hood parts in the automotive industry.

Should the disclosure of any patents, patent applications, and publications which are incorporated herein by reference conflict with the description of the present application to the extent that it may render a term unclear, the present description shall take precedence.

EXAMPLES

The disclosure will be now described in more detail with reference to the following examples, whose purpose is merely illustrative and not intended to limit the scope of the disclosure.

Starting Materials

The following materials were used to prepare the filaments of Examples 1 and 2:

PEEK #1: a poly(ether ether ketone) (PEEK) having a Mw of 71,300 g/mol, prepared according to the following process:

In a 500 ml 4-neck reaction flask fitted with a stirrer, a N2 inlet tube, a Claisen adapter with a thermocouple plunging in the reaction medium, and a Dean-Stark trap with a condenser and a dry ice trap were introduced 128 g of diphenyl sulfone, 28.6 g of p-hydroquinone, and 57.2 g of 4,4'-difluorobenzophenone.

The reaction mixture was heated slowly to 150° C. At 150° C., a mixture of 28.43 g of dry $Na_2CO_3$ and 0.18 g of dry $K_2CO_3$ was added via a powder dispenser to the reaction mixture over 30 minutes. At the end of the addition, the reaction mixture was heated to 320° C. at 1° C./minute. After 15 to 30 minutes, when the polymer had the expected Mw, the reaction was stopped by the introduction of 6.82 g of 4,4'-difluorobenzophenone to the reaction mixture while keeping a nitrogen purge on the reactor. After 5 minutes, 0.44 g of lithium chloride were added to the reaction mixture. 10 minutes later, another 2.27 g of 4,4'-difluorobenzophenone were added to the reactor and the reaction mixture was kept at temperature for 15 minutes. The reactor content was then cooled.

The solid was broken up and ground. The polymer was recovered by filtration of the salts, washing and drying. The GPC analysis showed a number average molecular weight Mw=71,300 g/mol.

PEEK #2: a poly(ether ether ketone) (PEEK) having a Mw of 102,000 g/mol, prepared according to the same process than PEEK #1, except that the reaction was stopped later.

PEEK #3: blend of 35 wt. % of PEEK #1 and 65 wt. % of PEEK #2, the blend having a measured Mw of 91,000 g/mol.

Filament Preparation Filaments were prepared for each polymer above-prepared using a Brabender® Intelli-Torque Plasti-Corde® Torque Rheometer extruder equipped with a 0.75" 32 L/D general purpose single screw, a filament head adapter, a 2.5-mm nozzle and ESI-Extrusion Services downstream equipment comprising a cooling tank, a belt puller, and a Dual Station Coiler. A Beta LaserMike® DataPro 1000 was used to monitor filament dimensions. The melt strand was cooled with air. The Brabender® zone set point temperatures were as follows: zone 1, 350° C.; zone 2, 340° C.; zones 3 and 4, 330° C. The Brabender® speed ranged from 30 to 50 rpm and the puller speed from 23 to 37 fpm.

Diameters of the filaments so-obtained:

PEEK #1: 1.75 mm±0.5 mm
PEEK #2: 1.75 mm±0.1 mm
PEEK #3: 1.75 mm±0.1 mm

The use of PEEK polymer having a higher Mw (PEEK #2) or the use of the blend of PEEK polymers of the present invention (PEEK #3) allows a better control of the filament size with a reduced standard deviation compared to the use of a PEEK polymer having a lower Mw (PEEK #1).

Test Methods

Weight Average Molecular Weight (Mw) of the PEK Polymers

The molecular weight was measured by gel permeation chromatography (GPC). Samples were dissolved in a 1:1 mixture of phenol and 1,2,4-trichlorobenzene at 190° C. temperature. Samples were then passed through 2×PL Gel mixed B, 10 m, 300×7.5 mm using a Polymer Laboratories PL-220 unit maintained at 160° C. equipped with a differential refractive index detector and calibrated with 12 narrow molecular weight polystyrene standards (Peak molecular weight range: 1,000-1,000,000). A flow rate of 1.0 ml/min and injection volume of 200 μL of a 0.2 w/v % sample solution was selected. The weight average molecular weight (Mw) was reported.

Impact Strength

Notched impact strength was determined according to the ASTM D256 method using a 2-ftlb hammer.

Tensile Strength

Tensile strength and modulus were determined according to the ASTM D638 method with Type V bars.

Example 1—Printing with Indmatec® HPP 155 3D Printer

Fused Filament Fabrication Bars (FFF Bars)

Test bars (i.e. ASTM D638 Type V bars) were printed from filaments of 1.75 mm in diameter on an Indmatec® HPP 155 3D printer equipped with a 0.6 mm diameter nozzle. Bars were oriented in the XY direction on the build platform during printing. Test bars were printed with a 10 mm-wide brim and three perimeters, according to ASTM Additive Manufacturing standard F2971-13. The tool path was a cross-hatch pattern with a 450 angle with respect to the long axis of the part. The build plate temperature for all bars was 100° C. The nozzle and extruder temperature was 405° C. The speed of the nozzle was varied from 8 to 18 mm/s. The first layer height in each case was 0.3 mm, with subsequent layers deposited at 0.1 mm height and 100% fill density.

The components and their respective amounts in the test bars (according to the present disclosure or comparative) and the mechanical properties of the same are reported in Table 1 below (5 test bars/mean value).

TABLE 1

|  | 1 | 2 | 3 |
|---|---|---|---|
| C: comparative | C | C | I |
| I: according to the disclosure |  |  |  |
| PEEK #1-Mw: 71,300 g/mol | 100 |  |  |
| PEEK #2-Mw: 102,000 g/mol |  | 100 |  |
| PEEK #3-Mw: 91,000 g/mol |  |  | 100 |
| Process | FFF | FFF | FFF |
| Printing quality | + | − | + |
| Nominal Tensile Strain at Break (%) | 4.4 | NR | 8.8 |
| Notched Impact (ft-lb/in) | 1.44 | NR | 1.57 |
| Testing Speed (in/min) | 0.05 | 0.05 | 0.05 |

NR: non relevant

The printing quality is assessed according to the Notched Impact test and the type of break obtained therefrom:

(−) means that the sample presents inter-layer delamination;

(+) means that the sample breaks according to a pattern similar to injection molded parts.

As shown in Table 1, it was not possible to print test bars of reasonable quality by FFF using filaments of PEEK #2, the values of the mechanical properties of such bars are therefore non relevant (NR).

The test bars of example 3 (obtained by FFF with a filament of PEEK having a Mw of 91,000 g/mol) exhibits both elongation at break and an impact resistance higher than the test bars of example 1 (obtained by FFF with a filament of PEEK of lower Mw, 71,300 g/mol).

The PEEK polymer having a Mw of 91,000 g/mol is therefore well-suited to the requirements of extrusion-based additive-manufacturing system (for example Fused Filament Fabrication) according to the present invention.

Example 2—Printing with Hyrel® Hydra 430 3D Printer

Fused Filament Fabrication Bars (FFF Bars)

Test bars (i.e. ASTM D638 Type V bars) were printed from filaments of 1.75 mm in diameter on a Hyrel Hydra 430 3D printer equipped with a 0.5 mm diameter nozzle. Bars were oriented in the XY direction on the build platform during printing. Test bars were printed with a 10 mm-wide brim and three perimeters, according to ASTM Additive Manufacturing standard F2971-13. The tool path was a cross-hatch pattern with a 45° angle with respect to the long axis of the part. The build plate temperature for all bars was 180° C. The nozzle and extruder temperature was 400° C. The speed of the nozzle was 40 mm/s. The first layer height in each case was 0.1 mm, with subsequent layers deposited at 0.1 mm height and 100% fill density.

TABLE 2

|  | 4 |
|---|---|
| I: according to the disclosure | I |
| PEEK #3-Mw: 91,000 g/mol | 100 |
| Process | FFF |
| Printing quality | + |
| Nominal Tensile Strain at Break (%) | 26 |
| Notched Impact (ft-lb/in) | 1.52 |
| Tensile strength at yield (MPa) | 85 |
| Modulus (GPa) | 3.1 |
| Testing Speed (in/min) | 0.05 |

The test bars of example 4 (obtained by FFF with a filament of PEEK having a Mw of 91,000 g/mol) under different printing conditions exhibits a very good elongation, modulus and tensile strength at break, as well as an impact resistance which are similar to the performances of parts obtained by injection molding.

In particular, the test bars of example 4 present a tensile strength at yield of 85 MPa, as measured according to ASTM D638 method with Type V bars.

The invention claimed is:

1. A method of making a three-dimensional (3D) object, comprising extruding a part material to print layers of the 3D object, wherein the part material comprises a polymeric component selected from the group consisting of:
   i) at least one poly(ether ether ketone) polymer (PEEK) having a weight average molecular weight (Mw) ranging from 75,000 to 100,000 g/mol (as determined by gel permeation chromatography (GPC) using phenol and trichlorobenzene (1:1) at 160° C., with polystyrene standards), and
   ii) at least two PEEK polymers having different Mw, the blend thereof having a weight average molecular weight (Mw) ranging from 75,000 to 100,000 g/mol (as determined by gel permeation chromatography (GPC) using phenol and trichlorobenzene (1:1) at 160° C., with polystyrene standards),
   wherein the term PEEK polymer denotes any polymer comprising at least 95 mol. % of recurring units ($R_{PEEK}$) of formula (J-A), based on the total

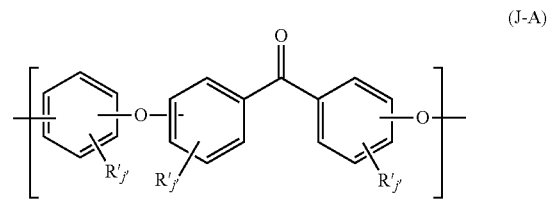

number of moles in the polymer:
   where
      R', at each location, is independently selected from the group consisting of halogen, alkyl, alkenyl, alkynyl, aryl, ether, thioether, carboxylic acid, ester, amide, imide, alkali or alkaline earth metal sultanate, alkyl sultanate, alkali or alkaline earth metal phosphonate, alkyl phosphonate, amine and quaternary ammonium; and
      J', for each R', is independently zero or an integer ranging from 1 to 4.

2. The method of claim 1, wherein the part material further comprises up to 30 wt. %, based on the total weight of the part material, of at least one additive selected from the group consisting of fillers, colorants, lubricants, plasticizers, flame retardants, nucleating agents, flow enhancer and stabilizers.

3. The method of claim 1, wherein the part material a further comprises up to 30 wt. %, based on the total weight of the part material, of at least one additive selected from the group consisting of hydroxyapatite, α-tricalcium phosphate (α-TCP), β-TCP and barium sulfate (BaSO$_4$).

4. The method of claim 1, wherein the polymeric component of the part material comprises at least 80 wt. % of PEEK polymer(s), based on the total weight of polymeric component of the part material.

5. The method of claim 1, wherein the part material is in the form of a filament.

6. The method of claim 1, wherein the PEEK polymer(s) comprises at least 95 mol. % of the recurring units are recurring units (R$_{PEEK}$) of formula (J"-A):

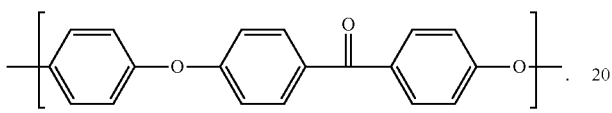

(J"-A)

the mol. % being based on the total number of moles in the polymer.

7. The method of claim 1, wherein the part material comprises a polymeric component comprising:
   ii1) a PEEK polymer having a Mw ranging from 50,000 to 85,000 g/mol, and
   ii2) a PEEK polymer having a Mw ranging from 85,000 to 120,000 g/mol,
   as determined by gel permeation chromatography (GPC) using phenol and trichlorobenzene (1:1) at 160° C., with polystyrene standards.

8. The method of claim 7, wherein the part material comprises a polymeric component comprising:
   ii1) from 10 to 60 wt. % of a PEEK polymer having a Mw ranging from 50,000 to 85,000 g/mol, and
   ii2) from 40 to 90 wt. % of a PEEK polymer having a Mw ranging from 85,000 to 120,000 g/mol,
   as determined by gel permeation chromatography (GPC) using phenol and trichlorobenzene (1:1) at 160° C., with polystyrene standards.

9. A filament material for its use in 3D printing having a cylindrical geometry and a diameter comprised between 0.5 and 5 mm±0.15 mm, said filament material comprising a polymeric component selected from the group consisting of:
   i) at least one poly(ether ether ketone) polymer (PEEK) having a weight average molecular weight (Mw) ranging from 75,000 to 100,000 g/mol (as determined by gel permeation chromatography (GPC) using phenol and trichlorobenzene (1:1) at 160° C., with polystyrene standards), and
   ii) at least two PEEK polymers having different Mw, the blend thereof having a weight average molecular weight (Mw) ranging from 75,000 to 100,000 g/mol (as determined by gel permeation chromatography (GPC) using phenol and trichlorobenzene (1:1) at 160° C., with polystyrene standards),
   wherein the term PEEK polymer denotes any polymer comprising at least 95 mol. % of recurring units (R$_{PEEK}$) of formula (J-A), based on the total number of moles in the polymer:

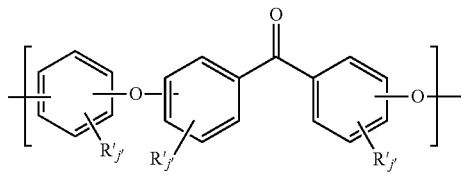

(J-A)

where
R', at each location, is independently selected from the group consisting of halogen, alkyl, alkenyl, alkynyl, aryl, ether, thioether, carboxylic acid, ester, amide, imide, alkali or alkaline earth metal sultanate, alkyl sultanate, alkali or alkaline earth metal phosphonate, alkyl phosphonate, amine and quaternary ammonium; and
J', for each R', is independently zero or an integer ranging from 1 to 4;
wherein the polymeric component comprises at least 80 wt. % of the PEEK polymer(s), based on the total weight of polymeric component of the filament.

10. The filament material of claim 9, further comprising from 0.1 to 30 wt. % of an additive selected from the group consisting of fillers, colorants, lubricants, plasticizers, flame retardants, nucleating agents, flow enhancers and stabilizers.

11. The filament material of claim 9, having a diameter comprised between 1 and 3.5 mm±0.15 mm.

12. A method for the manufacture of a filament to be used in the manufacture of three-dimensional objects, comprising:
   using a part material comprising a polymeric component selected from the group consisting of:
   i) at least one poly(ether ether ketone) polymer (PEEK) having a weight average molecular weight (Mw) ranging from 75,000 to 100,000 g/mol (as determined by gel permeation chromatography (GPC) using phenol and trichlorobenzene (1:1) at 160° C., with polystyrene standards), and
   ii) at least two PEEK polymers having different Mw, the blend thereof having a Mw ranging from 75,000 to 100,000 g/mol (as determined by gel permeation chromatography (GPC) using phenol and trichlorobenzene (1:1) at 160° C., with polystyrene standards),
   wherein the term PEEK polymer denotes any polymer comprising at least 95 mol. % of recurring units (R$_{PEEK}$) of formula (J-A), based on the total number of moles in the polymer:

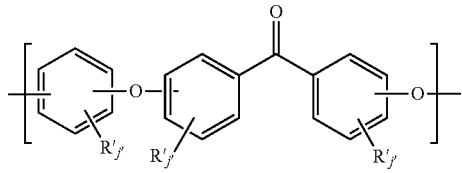

(J-A)

where
R', at each location, is independently selected from the group consisting of halogen, alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine and quaternary ammonium, and J', for each R', is independently zero or an integer ranging from 1 to 4.

13. The method of claim 12, wherein the filament has a cylindrical geometry and a diameter comprised between 0.5 and 5 mm±0.15 mm.

14. The method of claim 5, wherein the filament has a cylindrical geometry and a diameter comprised between 0.5 and 5 mm±0.15 mm.

15. The method of claim 14, wherein the filament has a diameter comprised between 1 and 3.5 mm±0.15 mm.

16. The filament material of claim 9, wherein the PEEK polymer(s) comprises at least 95 mol. % of the recurring units are recurring units ($R_{PEEK}$) of formula (J''-A):

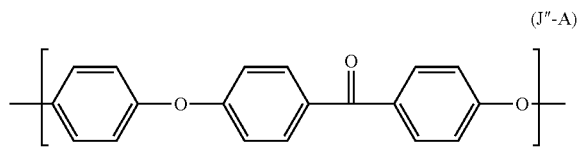

the mol. % being based on the total number of moles in the polymer.

17. The filament material of claim 9, wherein the PEEK polymer(s) comprising at least 98 mol. % of the recurring units are recurring units ($R_{PEEK}$) of formula (J''-A):

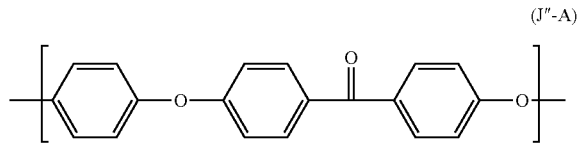

the mol. % being based on the total number of moles in the polymer.

18. The filament material of claim 9, wherein the polymeric component comprising:
   ii1) from 10 to 60 wt. % of a PEEK polymer having a Mw ranging from 50,000 to 85,000 g/mol, and
   ii2) from 40 to 90 wt. % of a PEEK polymer having a Mw ranging from 85,000 to 120,000 g/mol,
   as determined by gel permeation chromatography (GPC) using phenol and trichlorobenzene (1:1) at 160° C., with polystyrene standards.

19. The filament material of claim 9, wherein the polymeric component has a weight average molecular weight (Mw) ranging from 81,000 to 95,000 g/mol.

20. The filament material of claim 9, wherein the PEEK polymer(s) comprising at least 99 mol. % of the recurring units are recurring units ($R_{PEEK}$) of formula (J''-A):

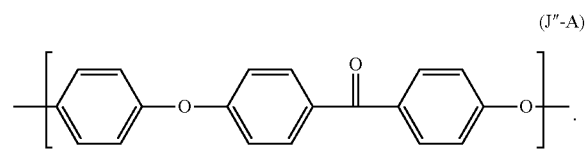

the mol. % being based on the total number of moles in the polymer.

21. The filament material of claim 9, wherein all of the recurring units in the PEEK polymer(s) are recurring units ($R_{PEEK}$) of formula (J''-A):

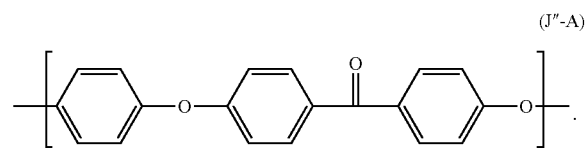

the mol. % being based on the total number of moles in the polymer.

* * * * *